(12) United States Patent
Liu et al.

(10) Patent No.: US 10,513,032 B2
(45) Date of Patent: Dec. 24, 2019

(54) METHOD OF CONTROLLING ROBOTIC ARM WITH HUMAN COMPUTER INTERACTION, AND TERMINAL AND SYSTEM FOR SAME

(71) Applicant: Shenzhen XiaoR Geek Technology Co., Ltd, Shenzhen, Guangdong (CN)

(72) Inventors: Hui Liu, Guangdong (CN); Xing Huang, Guangdong (CN)

(73) Assignee: Shenzhen XiaoR Geek Technology Co., Ltd, Shenzhen (CN)

(*) Notice: Subject to any disclaimer, the term of this patent is extended or adjusted under 35 U.S.C. 154(b) by 223 days.

(21) Appl. No.: 15/668,804

(22) Filed: Aug. 4, 2017

(65) Prior Publication Data

US 2018/0141212 A1    May 24, 2018

(30) Foreign Application Priority Data

Nov. 21, 2016  (CN) .......................... 2016 1 1026505

(51) Int. Cl.
| | |
|---|---|
| *B25J 9/16* | (2006.01) |
| *B25J 9/04* | (2006.01) |
| *B25J 11/00* | (2006.01) |

(52) U.S. Cl.
CPC ............ *B25J 9/1664* (2013.01); *B25J 9/046* (2013.01); *B25J 9/161* (2013.01); *B25J 9/1689* (2013.01); *B25J 11/0005* (2013.01); *G05B 2219/36168* (2013.01); *G05B 2219/40099* (2013.01); *G05B 2219/40522* (2013.01)

(58) Field of Classification Search
CPC ........ B25J 9/1664; B25J 9/161; B25J 9/1671; B25J 9/1689; B25J 11/0005; B25J 9/046; G05B 2219/40099; G05B 2219/36168; G05B 2219/40522
See application file for complete search history.

(56) References Cited

U.S. PATENT DOCUMENTS

| | | | |
|---|---|---|---|
| 7,211,980 B1* | 5/2007 | Bruemmer ........... | G05D 1/0246 318/567 |
| 7,606,633 B2* | 10/2009 | Hosokawa ............. | B25J 9/1666 318/568.11 |
| 8,332,067 B2* | 12/2012 | Ditscher ................ | B25J 9/1671 700/245 |
| 2002/0120362 A1* | 8/2002 | Lathan .................... | A63F 13/00 700/245 |
| 2006/0184275 A1* | 8/2006 | Hosokawa ............. | B25J 9/1666 700/245 |

(Continued)

*Primary Examiner* — Jason Holloway (57) ABSTRACT

A method of controlling a robotic arm with human-computer interaction, and terminal and system for the same are provided. The method of controlling the robotic arm with human-computer interaction includes: virtualizing a robotic arm to provide a virtual robotic arm having at least two movable nodes on a screen, and designating a distal movable node of the at least two movable nodes as a target node; when the target node is triggered, responding to a drag-and-drop operation by a user and generating a moving path according to a path of the drag-and-drop operation on the target node; and generating a controlling signal for controlling a motion of the robotic arm based on the moving path, and controlling the robotic arm to move according to a motion of the virtual robotic arm based on control of the controlling signal.

9 Claims, 4 Drawing Sheets

(56) References Cited

U.S. PATENT DOCUMENTS

2016/0332297 A1* 11/2016 Sugaya .................. B25J 9/161
2017/0165835 A1*  6/2017 Agarwal .............. G05D 1/0217
2018/0264646 A1*  9/2018 Sugaya .................. B25J 9/161

* cited by examiner

METHOD OF CONTROLLING ROBOTIC ARM WITH HUMAN COMPUTER INTERACTION, AND TERMINAL AND SYSTEM FOR SAME

CROSS REFERENCE TO RELATED APPLICATIONS

The present application claims the benefit of Chinese Patent Application No. 201611026505.0 filed on Nov. 21, 2016. All the above are hereby incorporated by reference.

TECHNICAL FIELD

The present application relates to the technical field in robotic arm control, particularly a method of controlling a robotic arm with human-computer interaction, and terminal and system for the same.

BACKGROUND

With the continuous development and improvement of electronic technology, technology in mechanical and electrical products evolves with every passing day. Among these mechanical and electrical products, robotic arm is one of the key components in the realization of automatic control thereof.

At the present time, robotic arms available on the market are largely composed of two types. The first type is under automatic control, where automatic control is used for realizing a specific action. For example, by adopting actions (such as automatic material-fetching and material-releasing) of the robotic arms, material-fetching and material-releasing operations are repeatedly executed through default programme and specific device of the robotic arm. The second type is a semi-automatic robotic arm, where motion of the robotic arm is operated under the control of an operator. The joints of the semi-automatic arm can be controlled according to specific needs. Therefore, from the point of view that the operational needs are realized by motion of a particular joint, the semi-automatic robotic arm possesses better operability than the automatic robotic arm. For instance, in the prior art, each joint of the semi-automatic robotic arm is implemented as a rectangular control strip on a display via software. When movement of the semi-automatic robotic arm is required, the control block of the control strip can be moved in order to realize bending of the semi-automatic robotic arm. However, when implementing the above operations on the semi-automatic robotic arm, the operator needs to perform adjustment on the status of every joint of the robotic arm at any time through visual inspection. The operation is complex and it is often necessary to control multiple sliding blocks. Hence, the operation efficiency is very low and this results in the problem of poor user experience.

In view of the above, it is essential to provide further improvement on the above method of controlling semi-automatic arms.

SUMMARY

In order to solve at least one of the above technical problems, the main objective of the present application is to provide a method of controlling a robotic arm with human-computer interaction.

In order to realize the above objective, the present application has adopted a technical solution which provides a method of controlling a robotic arm with human-computer interaction, including:

virtualizing a robotic arm to provide a virtual robotic arm having at least two movable nodes on a screen, and designating a distal movable node of the at least two movable nodes as a target node;

when the target node is triggered, responding to a drag-and-drop operation by a user and generating a moving path according to a path of the drag-and-drop operation on the target node; and generating a controlling signal for controlling a motion of the robotic arm based on the moving path, and controlling the robotic arm to move according to a motion of the virtual robotic arm based on control of the controlling signal.

Preferably, the step of generating the controlling signal for controlling the motion of the robotic arm based on the moving path, and controlling the robotic arm to move according to the motion of the virtual robotic arm based on control of the controlling signal includes:

within a set period, based on the moving path, recording a first initial angle between a first reference line and a line connecting an adjacent node and the target node at an initial position, and a first end angle between the first reference line and a line connecting the adjacent node and the target node at an end position;

calculating a first angle change of the lines connecting the adjacent node and the target node based on the first initial angle and the first end angle; and generating a first synchronized controlling signal for controlling the motion of the robotic arm based on the first angle change, thereby allowing the robotic arm to move in synchronization with the motion of the virtual robotic arm.

Preferably, prior to the step of based on the moving path, recording the initial angle of the line connecting the target node and the adjacent node, and the end angle of the line connecting the target node and the adjacent node, the method further includes:

determining whether the moving path of the target node lies on a first motion path; and if so, performing the step of recording the first initial angle between the first reference line and the line connecting the adjacent node and the target node at the initial position, and the first end angle between the first reference line and the line connecting the adjacent node and the target node at the end position.

Preferably, the step of determining whether the moving path of the target node lies on the first motion path further includes:

if the moving path of the target node does not lie on the first motion path, then recording a second initial angle between a second reference line and a line connecting the proximal node and the adjacent node at an initial position, and a second end angle between the second reference line and a line connecting the proximal node and the adjacent node at an end position, and recording a finishing position of the target node;

calculating a second angle change of the line connecting the proximal node and the adjacent node based on the second initial angle and the second end angle; and generating a second synchronized controlling signal for controlling the motion of the robotic arm based on the second angle change and the finishing position of the target node, thereby allowing the robotic arm to move in synchronization with the motion of the virtual robotic arm.

In order to realize the above objective, the present application has adopted another technical solution which provides a terminal for controlling a robotic arm with human-computer interaction, including:

a virtualization module for virtualizing a robotic arm to provide a virtual robotic arm having at least two movable nodes on a screen, and designating a distal movable node of the at least two movable nodes as a target node;

a response module for, when the target node is triggered, responding to a drag-and-drop operation by a user and generating a moving path according to a path of the drag-and-drop operation on the target node; and a process module for generating a controlling signal for controlling a motion of the robotic arm based on the moving path, and controlling the robotic arm to move according to a motion of the virtual robotic arm based on control of the controlling signal.

Preferably, the process module includes:

a record unit for, within a set period, based on the moving path, recording a first initial angle between a first reference line and a line connecting an adjacent node and the target node at an initial position, and a first end angle between the first reference line and a line connecting the adjacent node and the target node at an end position;

a calculation unit for calculating a first angle change of the line connecting the adjacent node and the target node based on the first initial angle and the first end angle; and a control unit for generating a first synchronized controlling signal for controlling the motion of the robotic arm based on the first angle change, thereby allowing the robotic arm to move in synchronization with the motion of the virtual robotic arm.

Preferably, the process module further includes:

a determination unit for determining whether the moving path of the target node lies on a first motion path; and if so, the record unit records the first initial angle between the first reference line and the line connecting the adjacent node and the target node at the initial position, and the first end angle between the first reference line and the line connecting the adjacent node and the target node at the end position.

Preferably, the determination unit is further configured for:

if the moving path of the target node does not lie on the first motion path, then recording a second initial angle between a second reference line and a line connecting the proximal node and the adjacent node at an initial position, and a second end angle between the second reference line and a line connecting the proximal node and the adjacent node at an end position, and recording a finishing position of the target node;

calculating a second angle change of the line connecting the proximal node and the adjacent node based on the second initial angle and the second end angle; and generating a second synchronized controlling signal for controlling the motion of the robotic arm based on the second angle change and the finishing position of the target node, thereby allowing the robotic arm to move in synchronization with the motion of the virtual robotic arm.

In order to realize the above objective, the present application has adopted another technical solution which provides a system for controlling a robotic arm with human-computer interaction, including a robotic arm, a driving structure for driving a motion of the robotic arm, and a control terminal for providing a controlling signal for the driving structure, wherein the control terminal includes the above terminal for controlling a robotic arm with human-computer interaction.

Specifically, the terminal for controlling the robotic arm with human-computer interaction, includes:

a virtualization module for virtualizing a robotic arm to provide a virtual robotic arm having at least two movable nodes on a screen, and designating a distal movable node of the at least two movable nodes as a target node;

a response module for, when the target node is triggered, responding to a drag-and-drop operation by a user and generating a moving path according to a path of the drag-and-drop operation on the target node; and a process module for generating a controlling signal for controlling a motion of the robotic arm based on the moving path, and controlling the robotic arm to move according to a motion of the virtual robotic arm based on control of the controlling signal.

The technical solutions of the present application virtualize a robotic arm to provide a virtual robotic arm having at least two movable nodes on a screen, and designate a distal movable node of the at least two movable nodes as a target node. The target node may response to a trigger action by a user (e.g. touching and sliding by a finger, or dragging and dropping by a mouse cursor). Specifically, when the target node is triggered, in response to a drag-and-drop operation by a user, a moving path is generated according to a path of the drag-and-drop operation on the target node. A controlling signal for controlling a motion of the robotic arm is generated based on the moving path, and the robotic arm is controlled to move according to a motion of the virtual robotic arm based on control of the controlling signal. As such, the user may control the robotic arm simply by dragging and dropping the distal movable node of the virtual robotic arm on the screen. This would greatly reduce the complexity in the robotic arm control, and at the same time increase the control precision. Moreover, it would no longer be necessary to perform adjustment on the status of the robotic arm by human visual inspection. This would increase the operation efficiency and provide a better user experience.

BRIEF DESCRIPTION OF THE DRAWINGS

In order to more clearly explain the embodiments of the present application or the technical solutions in the prior art, the drawings necessary for the explanation of the embodiments of the present application or the prior art are briefly introduced below. Apparently, the drawings discussed below are merely some of the embodiments of the present application. For one skilled in the art, other drawings could also be obtained according to the structures shown in the accompanying drawings without exercising any inventive effort.

The realization of the objective, functional characteristics and advantages of the present application are further explained with reference to the following examples and the accompanying drawings.

DETAILED DESCRIPTION

With reference to the accompanying drawings, the technical solutions provided by the embodiments of the present application are clearly and completely described below. Apparently, the described embodiments are merely a portion of embodiments of the present application and not all the embodiments. Based on the embodiments of the present application, all other embodiments obtained by one skilled in the art without exercising any inventive effort also belong to the scope protected by the present application.

It should be noted that terms such as "first" and "second" in the present application are merely for the purpose of description, and should not be interpreted as an indication or implication of their relative importance, nor should they be interpreted as implicitly indicating the quantity of that particular technical feature. As such, for a feature which is defined by a "first" or a "second", such terms explicitly or implicitly indicate that at least one of that features can be included. Moreover, the technical solution of each embodiment may be combined with one another, but this must be on the basis that such a combination could be implemented by one skilled in the art. When a combination of technical solutions results in contradiction or could not be implemented, such a combination of technical solutions should be regarded as being unavailable and is not under the scope sought to be protected by the present application.

Currently, in the process of controlling a robotic arm with multiple joints, it is necessary to perform sliding operations on multiple nodes simultaneously. As such, this results in the problems of complicated operation of the robotic arm and poor user experience. To this end, the present application provides a method of controlling a robotic arm with human-computer interaction, which aims to simplify the robotic arm control and enhance user experience. The specific method is described with reference to the following embodiments.

Figure 1:
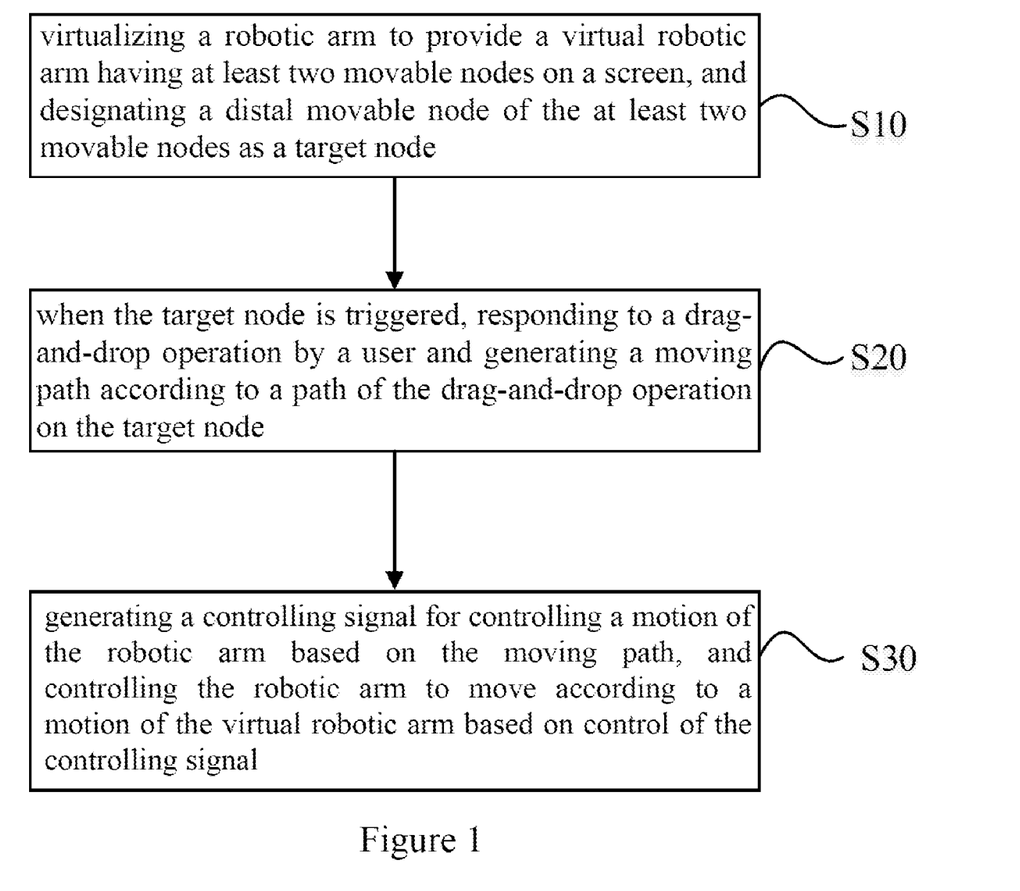
FIG. 1 is a flow diagram of a method of controlling a robotic arm with human-computer interaction according to an embodiment of the present application.

Referring to FIG. 1, in an embodiment of the present application, the method of controlling the robotic arm with human-computer interaction, includes the following steps:

Step S10—virtualizing a robotic arm to provide a virtual robotic arm having at least two movable nodes on a screen, and designating a distal movable node of the at least two movable nodes as a target node;

Step S20—when the target node is triggered, responding to a drag-and-drop operation by a user and generating a moving path according to a path of the drag-and-drop operation on the target node; and Step S30—generating a controlling signal for controlling a motion of the robotic arm based on the moving path, and controlling the robotic arm to move according to a motion of the virtual robotic arm based on control of the controlling signal.

Figure 3:
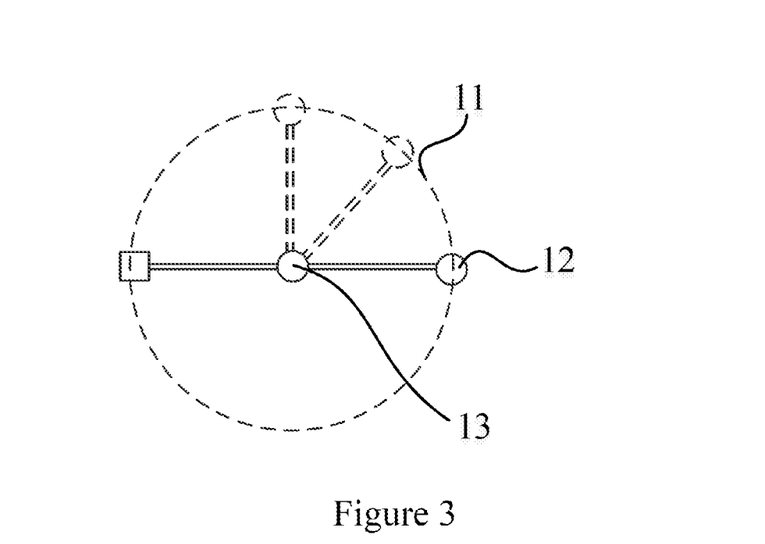
FIG. 3 is a structural diagram showing the motion of a node in the robotic arm in FIG. 1.

In the present embodiment, the virtual robotic arm having at least two movable nodes is firstly simulated on the screen. As such, the distal movable node of the at least two movable nodes may be selected as the target node. The target node may be moved by dragging and dropping of the mouse cursor, or by dragging and dropping by sliding the finger. When the target node is moved by dragging and dropping, the moving path may be generated according to the drag-and-drop motion of the target node. The moving path may be an angle increment from a line connecting an adjacent node and the distal node (target node) at an initial position, to a line connecting the adjacent node and the distal node at an end position, or the like. Referring to FIG. 3, the target node 12 being a movable point, may rotate around a first node 13 (the adjacent node). As such, the controlling signal for controlling the motion of the robotic arm may be generated by calculating the angle increment of the lines connecting the adjacent node and the distal node from the initial position to the end position, thereby controlling the synchronized motion of the robotic arm.

The technical solutions of the present application virtualize the robotic arm to provide the virtual robotic arm having the at least two movable nodes on the screen, and designate the distal movable node of the at least two movable nodes as the target node 12. The target node 12 may response to the trigger action by the user (e.g. touching and sliding by the finger, or dragging and dropping by the mouse cursor). Specifically, when the target node 12 is triggered, in response to the drag-and-drop operation by the user, the moving path is generated according to the path of the drag-and-drop operation on the target node 12. The controlling signal for controlling the motion of the robotic arm is generated based on the moving path, and the robotic arm is controlled to move according to the motion of the virtual robotic arm based on control of the controlling signal. As such, the user may control the robotic arm simply by dragging and dropping the distal movable node of the virtual robotic arm on the screen. This would greatly reduce the complexity in the robotic arm control, and at the same time increase the control precision. Moreover, it would no longer be necessary to perform adjustment on the status of the robotic arm by human visual inspection. This would increase the operation efficiency and provide a better user experience.

Figure 2:
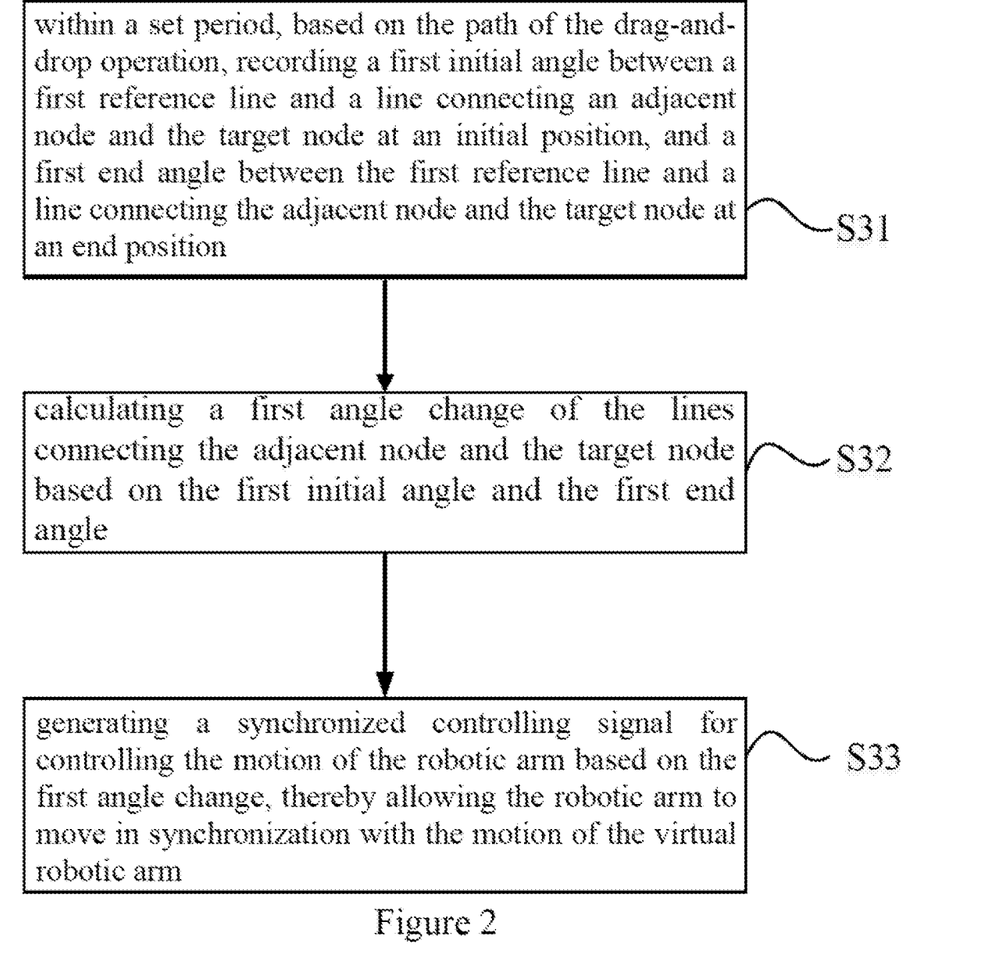
FIG. 2 is a specific flow diagram of the step S30 in FIG. 1.

Referring to FIG. 2, in a preferred embodiment of the present application, the step S30 of generating the controlling signal for controlling the motion of the robotic arm based on the moving path, and controlling the robotic arm to move according to the motion of the virtual robotic arm based on control of the controlling signal specifically includes:

Step S31—within a set period, based on the path of the drag-and-drop operation, recording a first initial angle between a first reference line and a line connecting an adjacent node and the target node at an initial position, and a first end angle between the first reference line and a line connecting the adjacent node and the target node at an end position;

Step S32—calculating a first angle change of the lines connecting the adjacent node and the target node based on the first initial angle and the first end angle; and Step S33—generating a first synchronized controlling signal for controlling the motion of the robotic arm based on the first angle change, thereby allowing the robotic arm to move in synchronization with the motion of the virtual robotic arm.

In order to increase control precision and reduce complexity of calculation, in the present embodiment, within a set period, the first angle change of the lines connecting the adjacent node and the target node may be calculated based on the first initial angle between the first reference line and the line connecting the adjacent node and the target node at the initial position, and the first end angle between the first reference line and the line connecting the adjacent node and the target node at the end position, e.g. the first end angle minus the first initial angle would give the first angle change within a unit time. Then, the first synchronized controlling signal may be generated based on the angle change, thereby enabling the synchronized motion of the robotic arm.

In a preferred embodiment of the present application, prior to the step S31 of based on the path of the drag-and-drop operation, recording a first initial angle between a first reference line and a line connecting an adjacent node and the target node at an initial position, and a first end angle between the first reference line and a line connecting the adjacent node and the target node at an end position, the method further includes:

determining whether the moving path of the target node lies on a first motion path; and if the moving path of the target node lies on the first motion path, then within a set period, based on the moving path, recording the first initial angle between the first reference line and the line connecting the adjacent node and the target node at the initial position, and the first end angle between the first reference line and the line connecting the adjacent node and the target node at the end position.

Referring to FIG. 3, the simplest calculation would be a situation where the problem according to the user's needs is solved by using the motion of the distal node. As such, the target node 12 only moves on the first motion path 11, being a circumference having a radius of a distance between the target node 12 and the adjacent node.

In a preferred embodiment of the present application, the at least two movable nodes include a third movable node designated as a proximal node, wherein the movable nodes are connected in the order of proximal node-adjacent node-target node, the step of determining whether the moving path of the target node lies on the first motion path further includes:

if the moving path of the target node does not lie on the first motion path, then recording a second initial angle between a second reference line and a line connecting the proximal node and the adjacent node at an initial position, and a second end angle between the second reference line and a line connecting the proximal node and the adjacent node at an end position, and recording a finishing position of the target node;

calculating a second angle change of the line connecting the proximal node and the adjacent node based on the second initial angle and the second end angle; and generating a second synchronized controlling signal for controlling the motion of the robotic arm based on the second angle change and the finishing position of the target node, thereby allowing the robotic arm to move in synchronization with the motion of the virtual robotic arm.

Figure 4:
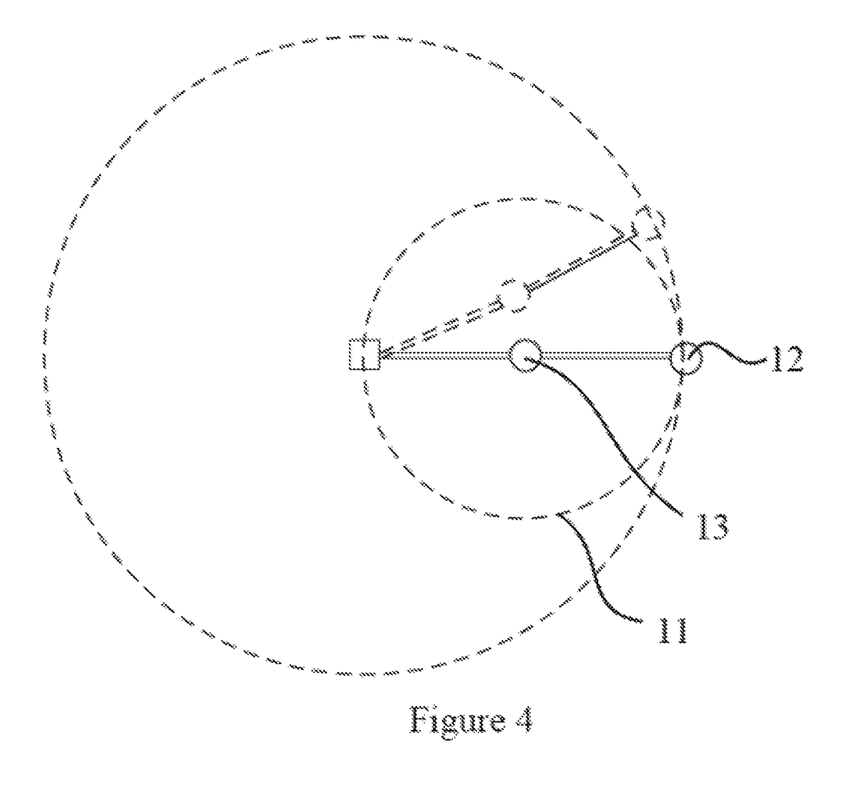
FIG. 4 is another structural diagram showing the motion of a node in the robotic arm in FIG. 1.

Referring to FIG. 4, when the problem according to the user's needs cannot be solved by using the motion of the distal node, i.e., the moving path of the target node 12 is not on the first motion path 11, the controlling signal may be generated based on the second angle change of the lines connecting the proximal node and the first node (the adjacent node) from the initial position to the end position, as well as the position of the distal node, thereby driving the robotic arm in synchronized motion.

Figure 5:
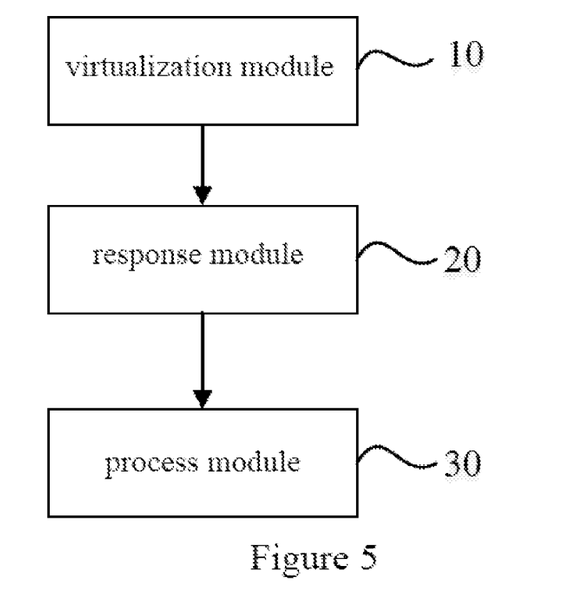
FIG. 5 is a block diagram of modules of the terminal for controlling a robotic arm with human-computer interaction according to an embodiment of the present application.

Referring to FIG. 5, in an embodiment of the present application, the terminal for controlling a robotic arm with human-computer interaction, including:

a virtualization module 10 for virtualizing a robotic arm to provide a virtual robotic arm having at least two movable nodes on a screen, and designating a distal movable node of the at least two movable nodes as a target node;

a response module 20 for, when the target node is triggered, responding to a drag-and-drop operation by a user and generating a moving path according to a path of the drag-and-drop operation on the target node; and a process module 30 for generating a controlling signal for controlling a motion of the robotic arm based on the moving path, and controlling the robotic arm to move according to a motion of the virtual robotic arm based on control of the controlling signal.

In the present embodiment, the virtual robotic arm having at least two movable nodes is firstly simulated on the screen by the virtualization module 10. As such, the distal movable node of the at least two movable nodes may be selected as the target node. The target node may be moved by dragging and dropping of the mouse cursor, or by dragging and dropping by sliding the finger. When the target node is moved by dragging and dropping, the moving path may be generated by the response module 20 according to the drag-and-drop motion of the target node. The moving path may be an angle increment from a line connecting the adjacent node and the distal node at an initial position, to a line connecting the adjacent node and the distal node at an end position, or the like. Referring to FIG. 3, the distal node being a movable point, may rotate around a first node 13 (the adjacent node). As such, the controlling signal for controlling the motion of the robotic arm may be generated by the process module 30 through calculation of the angle increment of the lines connecting the adjacent node and the distal node from the initial position to the end position, thereby controlling the synchronized motion of the robotic arm.

Figure 6:
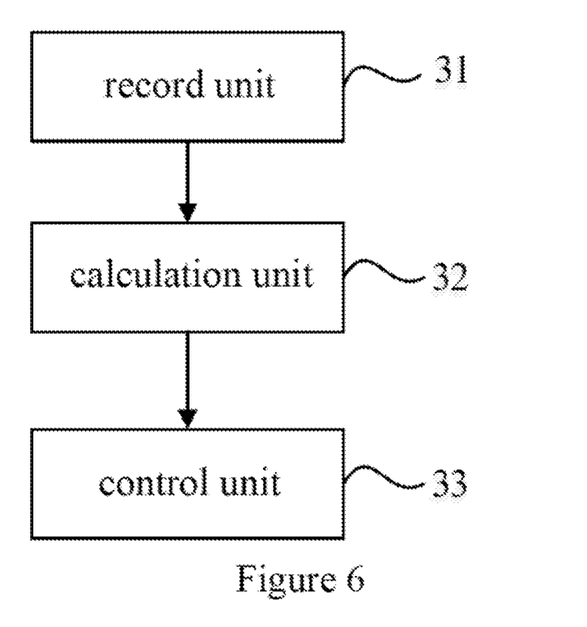
FIG. 6 is a block diagram of the process module in FIG. 5.

Referring to FIG. 6, the process module 30 includes:

a record unit 31 for, within a set period, based on the path of the drag-and-drop operation, recording a first initial angle between a first reference line and a line connecting an adjacent node and the target node at an initial position, and a first end angle between the first reference line and a line connecting the adjacent node and the target node at an end position;

a calculation unit 32 for calculating a first angle change of the lines connecting the adjacent node and the target node based on the first initial angle and the first end angle; and a control unit 33 for generating a first synchronized controlling signal for controlling the motion of the robotic arm based on the first angle change, thereby allowing the robotic arm to move in synchronization with the motion of the virtual robotic arm.

In order to increase control precision and reduce complexity of calculation, in the present embodiment, the first initial angle between the first reference line and the line connecting the adjacent node and the target node at the initial position, and the first end angle between the first reference line and the line connecting the adjacent node and the target node at the end position, may be recorded by the record unit 31. Then, within a set period, the first angle change of the lines connecting the adjacent node and the target node may be calculated by the calculation unit 32 based on the first initial angle between the first reference line and the line connecting the adjacent node and the target node at the initial position, and the first end angle between the first reference line and the line connecting the adjacent node and the target node at the end position, e.g. the first end angle minus the first initial angle would give the first angle change within a unit time. Then, the first synchronized controlling signal may be generated by the control unit 33 based on the angle change, thereby enabling the synchronized motion of the robotic arm.

Referring to FIG. 6, in a preferred embodiment of the present application, the process module further includes:

a determination unit for determining whether the moving path of the target node lies on a first motion path; and if the moving path of the target node lies on the first motion path, then within a set period, based on the moving path, the first initial angle between the first reference line and the line connecting the adjacent node and the target node at the initiate position, and the first end angle between the first reference line and the line connecting the adjacent node and the target node at the end position, are recorded.

Referring to FIG. 3, the simplest calculation would be a situation where the problem according to the user's needs is solved by using the motion of the distal node. As such, the target node 12 only moves on the first motion path 11, being a circumference having a radius of a distance between the target node 12 and the adjacent node.

In a preferred embodiment of the present application, the at least two movable nodes include a third movable node designated as a proximal node, wherein the movable nodes are connected in the order of proximal node-adjacent node-target node, the determination unit is further configured for:

if the moving path of the target node does not lie on the first motion path, then recording a second initial angle between a second reference line and a line connecting the proximal node and the adjacent node at an initial position, and a second end angle between the second reference line and a line connecting the proximal node and the adjacent node at an end position, and recording a finishing position of the target node;

calculating a second angle change of the line connecting the proximal node and the adjacent node based on the second initial angle and the second end angle; and generating a first synchronized controlling signal for controlling the motion of the robotic arm based on the second angle change and the finishing position of the target node, thereby allowing the robotic arm to move in synchronization with the motion of the virtual robotic arm.

Referring to FIG. 4, when the problem according to the user's needs cannot be solved by using the motion of the distal node, i.e., the moving path of the target node 12 is not on the first motion path 11, the controlling signal may be generated based on the second angle change of the lines connecting the proximal node and the first node 13 (the adjacent node) from the initial position to the end position, as well as the position of the distal node, thereby driving the robotic arm in synchronized motion.

In an embodiment of the present application, the system for controlling a robotic arm with human-computer interaction, including a robotic arm, a driving structure for driving a motion of the robotic arm, and a control terminal for providing a controlling signal for the driving structure, wherein the control terminal includes the above terminal for controlling the robotic arm with human-computer interaction. Please refer to the above embodiments for the specific structures of the terminal for controlling the robotic arm with human-computer interaction, and the same will not be repeated here. Since the system for controlling the robotic arm with human-computer interaction adopts the above terminal for controlling the robotic arm with human-computer interaction, at least it possesses all advantages and effects of the terminal for controlling the robotic arm with human-computer interaction.

The above are merely the preferred embodiments of the present application, and are not intended to limit the scope of the present application. Under the ideas of the present application, equivalent structural conversion performed based on the content in the specification and drawings of the present application, or direct/indirect application of the same in other related technical fields are all encompassed in the scope of protection of the present application.

What is claimed is:

1. A method of controlling a robotic arm with human-computer interaction, comprising:

virtualizing, by a processor, a robotic arm to provide a virtual robotic arm having at least two movable nodes on a screen, and designating a distal movable node of the at least two movable nodes as a target node;

when the target node is triggered by a user in the screen, responding to a drag-and-drop operation by the user, generating, by the processor, a moving path according to a path of the drag-and-drop operation on the target node; and generating, by the processor, a controlling signal for controlling a motion of the robotic arm based on the moving path, and controlling the robotic arm to move according to a motion of the virtual robotic arm based on control of the controlling signal;

wherein the step of generating the controlling signal for controlling the motion of the robotic arm based on the moving path, and controlling the robotic arm to move according to the motion of the virtual robotic arm based on control of the controlling signal comprises:

within a set period, based on the moving path, recording a first initial angle between a first reference line and a line connecting the target node at an initial position and an adjacent node, and a first end angle between the first reference line and a line connecting the target node at an end position and the adjacent node;

calculating a first angle change of the lines connecting the adjacent node and the target node based on the first initial angle and the first end angle; and generating a first synchronized controlling signal for controlling the motion of the robotic arm based on the first angle change, thereby allowing the robotic arm to move in synchronization with the motion of the virtual robotic arm.

2. The method according to claim 1, further comprising: determining whether the moving path of the target node lies on a first motion path; and when the moving path of the target node lies on the first motion path, performing the step of recording the first initial angle between the first reference line and the line connecting the target node at the initial position and the adjacent node, and the first end angle between the first reference line and the line connecting the target node at the end position and the adjacent node.

3. The method according to claim 2, wherein the at least two movable nodes include a third movable node designated as a proximal node, the movable nodes are connected in the order of proximal node-adjacent node-target node; wherein the method further comprises:

when the moving path of the target node does not lie on the first motion path, then recording a second initial angle between a second reference line and a line connecting the adjacent node at an initial position and the proximal node, and a second end angle between the second reference line and a line connecting the adjacent node at an end position and the proximal node, and recording a finishing position of the target node;

calculating a second angle change of the lines connecting the proximal node and the adjacent node based on the second initial angle and the second end angle; and generating a second synchronized controlling signal for controlling the motion of the robotic arm based on the second angle change and the finishing position of the target node, thereby allowing the robotic arm to move in synchronization with the motion of the virtual robotic arm.

4. A terminal for controlling a robotic arm with human-computer interaction, the terminal comprising a processor comprising:

a virtualization module for virtualizing a robotic arm to provide a virtual robotic arm having at least two movable nodes on a screen, and designating a distal movable node of the at least two movable nodes as a target node;

a response module for, when the target node is triggered by a user in the screen, responding to a drag-and-drop operation by the user, generating a moving path according to a path of the drag-and-drop operation on the target node; and a process module for generating a controlling signal for controlling a motion of the robotic arm based on the moving path, and controlling the robotic arm to move according to a motion of the virtual robotic arm based on control of the controlling signal;

wherein the process module comprises:

a record unit for, within a set period, based on the moving path, recording a first initial angle between a first reference line and a line connecting the target node at an initial position and an adjacent node, and a first end angle between the first reference line and a line connecting the target node at an end position and the adjacent node;

a calculation unit for calculating a first angle change of the lines connecting the adjacent node and the target node based on the first initial angle and the first end angle; and a control unit for generating a first synchronized controlling signal for controlling the motion of the robotic arm based on the first angle change, thereby allowing the robotic arm to move in synchronization with the motion of the virtual robotic arm.

5. The terminal according to claim 4, wherein the process module further comprises:

a determination unit for determining whether the moving path of the target node lies on a first motion path; and when the moving path of the target node lies on the first motion path, the record unit records the first initial angle between the first reference line and the line connecting the target node at the initial position and the adjacent node, and the first end angle between the first reference line and the line connecting the target node at the end position and the adjacent node.

6. The terminal according to claim 5, wherein the at least two movable nodes include a third movable node designated as a proximal node, the movable nodes are connected in the order of proximal node-adjacent node-target node; the process module is further configured for:

when the moving path of the target node does not lie on the first motion path, then recording a second initial angle between a second reference line and a line connecting the adjacent node at an initial position and the proximal node, and a second end angle between the second reference line and a line connecting the adjacent node at an end position and the proximal node, and recording a finishing position of the target node;

calculating a second angle change of the lines connecting the proximal node and the adjacent node based on the second initial angle and the second end angle; and generating a second synchronized controlling signal for controlling the motion of the robotic arm based on the second angle change and the finishing position of the target node, thereby allowing the robotic arm to move in synchronization with the motion of the virtual robotic arm.

7. A system for controlling a robotic arm with human-computer interaction, comprising a robotic arm, a driving structure for driving a motion of the robotic arm, and a control terminal for providing a controlling signal for the driving structure, wherein the control terminal comprises a terminal comprising a processor comprising:

a virtualization module for virtualizing a robotic arm to provide a virtual robotic arm having at least two movable nodes on a screen, and designating a distal movable node of the at least two movable nodes as a target node;

a response module for, when the target node is triggered by a user in the screen, responding to a drag-and-drop operation by the user, generating a moving path according to a path of the drag-and-drop operation on the target node; and a process module for generating a controlling signal for controlling a motion of the robotic arm based on the moving path, and controlling the robotic arm to move according to a motion of the virtual robotic arm based on control of the controlling signal;

wherein the process module comprises:

a record unit for, within a set period, based on the moving path, recording a first initial angle between a first reference line and a line connecting the target node at an initial position and an adjacent node, and a first end angle between the first reference line and a line connecting the target node at an end position and the adjacent node;

a calculation unit for calculating a first angle change of the lines connecting the adjacent node and the target node based on the first initial angle and the first end angle; and a control unit for generating a first synchronized controlling signal for controlling the motion of the robotic arm based on the first angle change, thereby allowing the robotic arm to move in synchronization with the motion of the virtual robotic arm.

8. The system according to claim 7, wherein the process module further comprises:

a determination unit for determining whether the moving path of the target node lies on a first motion path; and when the moving path of the target node lies on the first motion path, the record unit records the first initial angle between the first reference line and the line connecting the target node at the initial position and the adjacent node, and the first end angle between the first reference line and the line connecting the target node at the end position and the adjacent node.

9. The system according to claim 8, wherein the at least two movable nodes include a third movable node designated as a proximal node, the movable nodes are connected in the order of proximal node-adjacent node-target node; the process module is further configured for:

when the moving path of the target node does not lie on the first motion path, then recording a second initial angle between a second reference line and a line connecting the adjacent node at an initial position and the proximal node, and a second end angle between the second reference line and a line connecting the adjacent node at an end position and the proximal node, and recording a finishing position of the target node;

calculating a second angle change of the lines connecting the proximal node and the adjacent node based on the second initial angle and the second end angle; and generating a second synchronized controlling signal for controlling the motion of the robotic arm based on the second angle change and the finishing position of the target node, thereby allowing the robotic arm to move in synchronization with the motion of the virtual robotic arm.

\* \* \* \* \*